(12) United States Patent
Wang et al.

(10) Patent No.: US 6,606,311 B1
(45) Date of Patent: Aug. 12, 2003

(54) QOS FRAMEWORK FOR CDMA 2000

(75) Inventors: Chung-Ching Wang, Plano, TX (US); Serge Manning, Plano, TX (US); Sanjoy Sen, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/454,017

(22) Filed: Dec. 3, 1999

Related U.S. Application Data

(60) Provisional application No. 60/130,142, filed on Apr. 20, 1999.

(51) Int. Cl.[7] .................................................. H04Q 7/24
(52) U.S. Cl. ......................... 370/338; 370/335; 370/329; 370/342
(58) Field of Search .................................. 370/230, 231, 370/329, 335, 338, 342, 310.1, 310.2, 441

(56) References Cited

U.S. PATENT DOCUMENTS

| | | | | |
|---|---|---|---|---|
| 5,499,238 A | * | 3/1996 | Shon .......................... 370/60.1 |
| 5,787,080 A | * | 7/1998 | Hulyalkar et al. .......... 370/348 |
| 6,154,458 A | * | 11/2000 | Kudoh et al. ................ 370/395 |
| 6,324,166 B1 | * | 11/2001 | Yokoyama et al. .......... 370/234 |
| 6,349,098 B1 | * | 2/2002 | Parruck et al. .............. 370/395 |
| 6,374,112 B1 | * | 4/2002 | Widegreen et al. ......... 455/452 |
| 6,469,993 B1 | * | 10/2002 | Seo et al. .................... 370/329 |
| 6,501,736 B1 | * | 12/2002 | Smolik et al. .............. 370/252 |

* cited by examiner

*Primary Examiner*—William Trost
*Assistant Examiner*—Eugene Yun
(74) *Attorney, Agent, or Firm*—John D. Crane; Bracewell & Patterson, L.L.P.

(57) ABSTRACT

An adaptation sublayer is provided between LAC/MAC and a Packet Data Service Node for a Code Division Multiple Access telecommunication system. Quality of Service parameters are defined and stored within a Base Station and Base Transceiver Station along with subscriber profiles, including class of service. The profiles include specified Quality of Service requirements for each subscriber profile. A Quality of Service Adaptation Layer provides logic and control means to identify each active subscriber, provide the associated Quality of Service and direct the active subscriber's communication connection to a target host.

17 Claims, 5 Drawing Sheets

QOS FRAMEWORK FOR CDMA 2000

This application claims the benefit of provisional application ser. No. 60/130,142 filed Apr. 20, 1999.

CROSS REFERENCE TO RELATED APPLICATIONS

Cross reference is made to commonly assigned U.S. patent application Ser. No. 09/454,793 filed Dec. 3, 1999, entitled "Providing Support for Multiple QoS Levels Within a Third Generation Packet Session", in which the teachings of each are incorporated herein by reference.

FIELD OF THE INVENTION

The present invention relates in general to wireless communication networks and particularly to service levels within the communication networks. More particularly, the present invention relates to measuring and providing specific levels of service within a wireless network.

BACKGROUND OF THE INVENTION

A Quality of Service (QoS) level (plane) is derived from requirements by communications applications and generally has very specific guidelines in wireline and Asynchronous Transfer Mode network systems. Traditionally, applications that require a certain level of service are contracted for by a customer with a telecommunications operator. The requirements are set out with pre-defined values capable of being measured and provided by the operator. Typically, the requirements relate to availability of bandwidth, delay, error rate, priority, exclusivity, etc. QoS architectures are used to provide mechanisms and procedures to measure and provide specific QoS services.

Acronyms and abbreviations that may be frequently used throughout this disclosure are defined below.

ARQ Automatic Retransmission reQuest, a standard method for checking transmitted data BS Base Station BTS Base Transceiver Station CDMA Code Division Multiple Access, a term descriptive of a wireless air interface utilizing Code Division Multiple Access technology CON_REF A unique 8-bit variable assigned by the base station for each service option connection End-to-End delay is the delay experienced by service traffic LAC Link Access Control—utilizes a protocol for data link-level transmission control; the upper sub-layer of IEEE Layer 2 (OSI) protocol that complements the MAC protocol MAC Medium Access Control—lower sub-layer of IEEE Layer 2 (OSI) protocol that supports topology-dependent functions and uses the services of the physical layer to provide services to LAC MS Mobile Station QoS Quality of Service—a set of requirements and related performance parameters that characterize communications traffic over a given connection RLP Radio Link Protocol sr_id Service Reference ID—an identifier contained in a Service Instance Table for associating a service with the proper LAC/MAC class QoS is relatively easy to define in digital circuits and QoS with respect to ATM standards are defined as Class 0, 1, 2, 3, and 4. Class 0 is a best effort service; Class 1 is equivalent to a digital private line and specifies a connection-oriented Constant Bit Rate (CBR) time dependent traffic such as uncompressed video; Class 2 specifies a delay dependent connection-oriented class for Variable Bit Rate (VBR) traffic such as compressed voice and video; Class 3 specifies a VBR delay-tolerant data connection such as packet and Frame Relay traffic; and Class 4 specifies connectionless data transfer such as signaling and control, and network management data.

QoS in the wireline world is provided on the Internet (a packet based system) utilizing two approaches: qualitative and quantitative. The Qualitative approach is based on Differentiated Services (Diff-Serv) which is a reservation-less model. Diff-Serv with up to 64 Per Hop Behaviors (PHB) may be segregated into a small number of service types by utilizing the Type of Service/Diff-Serv (ToS/DS) byte in an IP header. Priority mechanisms are utilized to provide QoS to packet traffic.

Integrated Services (Int-Serv) provides end to end QoS by reserving resources for data traffic. Resource Reservation Protocol (RSVP) signaling is a protocol that reserves resources so as to provide the required QoS. QoS requests are propagated to all routers along a data path allowing the network to configure itself to meet a desired level of service. Int-Serv is independent of the actual mechanism used to provide the reservations, but Int-Serv specifies, generically, traffic and path characteristics for a transmission. Currently, there are schemes being developed to interwork Diff-Serv and Int-Serv.

cdma2000 (3G Code Division Multiple Access) is a proposed standard for packet based communications on wireless networks. cdma2000 is a name identifying the Telecommunications Industry Association (TIA) IS-2000 standard and its future revisions for a third generation (3G) technology for a migration path that supports second generation networks and supports upgrade to 3G services for cellular and PCS operators. cdma2000 includes support for Direct Spread (DS) and Multi-Carrier (MC), for forward link only, frequency division duplex configuration, full support, for Packet and Circuit Data Services up to 2 Mbps, RLP support for all data rates up to 2 Mbps, Multiple Voice, Packet and Circuit Data services concurrently, Voice over Packet and all channel sizes (1×, 3×, 6×, 9×, 12×). Since many contracts for service are based on signal quality and bandwidth availability, customers that require high speed data transmission or broad bandwidth or even minimal (best effort) service, indicates that there is a need for quality of service measurements or standards.

One approach for supporting cdma2000 QoS is to maintain a single class of LAC/MAC (the current method) that provides procedures for handling various QoS requirements. However, with only one set of mechanisms to provide the bandwidth availability, etc., QoS flexibility would be limited. Efficiency is also affected with the need to switch between resource management systems when different QoS levels are required.

It would be desirable therefore, to provide a method and system that would support quantitative as well as qualitative QoS parameters in a wireless telecommunication network due to the use of an IP network, such as the Internet, for communication. It would also be desirable to classify wireless IP data traffic flow to a pre-defined CDMA QoS class. It would further be desirable to provide a method and system that would make available a plurality of defined QoS classes to a CDMA user.

SUMMARY OF THE INVENTION

It is therefore one object of the present invention to provide a method and system for that would support quantitative as well as qualitative QoS parameters in a wireless telecommunication network.

It is another object of the present invention to provide a method and system to identify and apply an appropriate QoS class of service to wireless IP data traffic flow.

It is yet another object of the present invention to provide a method and system that will provide multiple defined QoS classes for wide support on radio links in a CDMA communications system.

The foregoing objects are achieved as is now described. An adaptation sublayer is provided between LAC/MAC and a Packet Data Service Node for a CDMA telecommunication system. Quality of Service parameters are defined and stored within a Base Station and Base Transceiver Station along with subscriber profiles, including class of service. The profiles include specified Quality of Service requirements for each subscriber profile. A Quality of Service Adaptation Layer provides logic and control means to identify each active service from a subscriber, provide the associated Quality of Service and direct the active service's communication connection to a target Packet Data Service Node.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
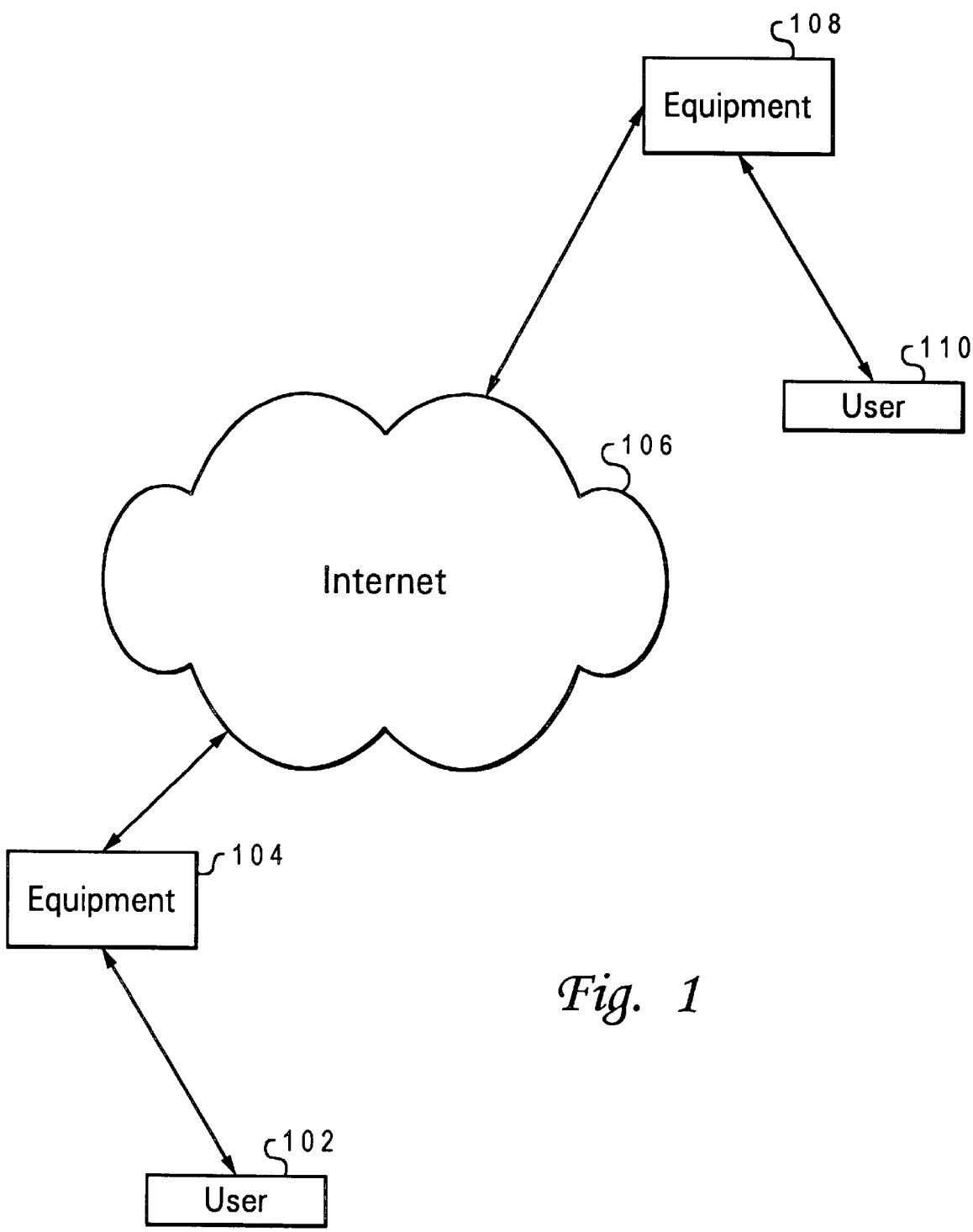
FIG. 1 depicts a wireless communication system in which a preferred embodiment of the present invention may be implemented.

With reference now to the figures, and in particular with reference to FIG. 1, a wireless communication system in which a preferred embodiment of the present invention may be implemented, is depicted. User 102 transmits a radio signal that is received by equipment 104 which then transmits the signal to a connected IP network, in this instance Internet 106. The signal is transmitted via Internet 106 to equipment 108 which is receiving and connecting equipment for user 110.

User 102 can include a wireline as well as a wireless communications device and devices capable of communicating on Internet 106 include wireline, wireless, computing, fax, voice and virtually any IP compatible device. Transmissions between user devices 102 and 110 are processed by the connecting equipment 104 and 108. If user 102 is using a wireless communication device, the connecting equipment would include a transmitting and receiving tower (BTS), a base station controller and a mobile switching center. User 102 can connect to any other user on the IP network as long as the communication protocols of each user device are compatible.

Figure 2:
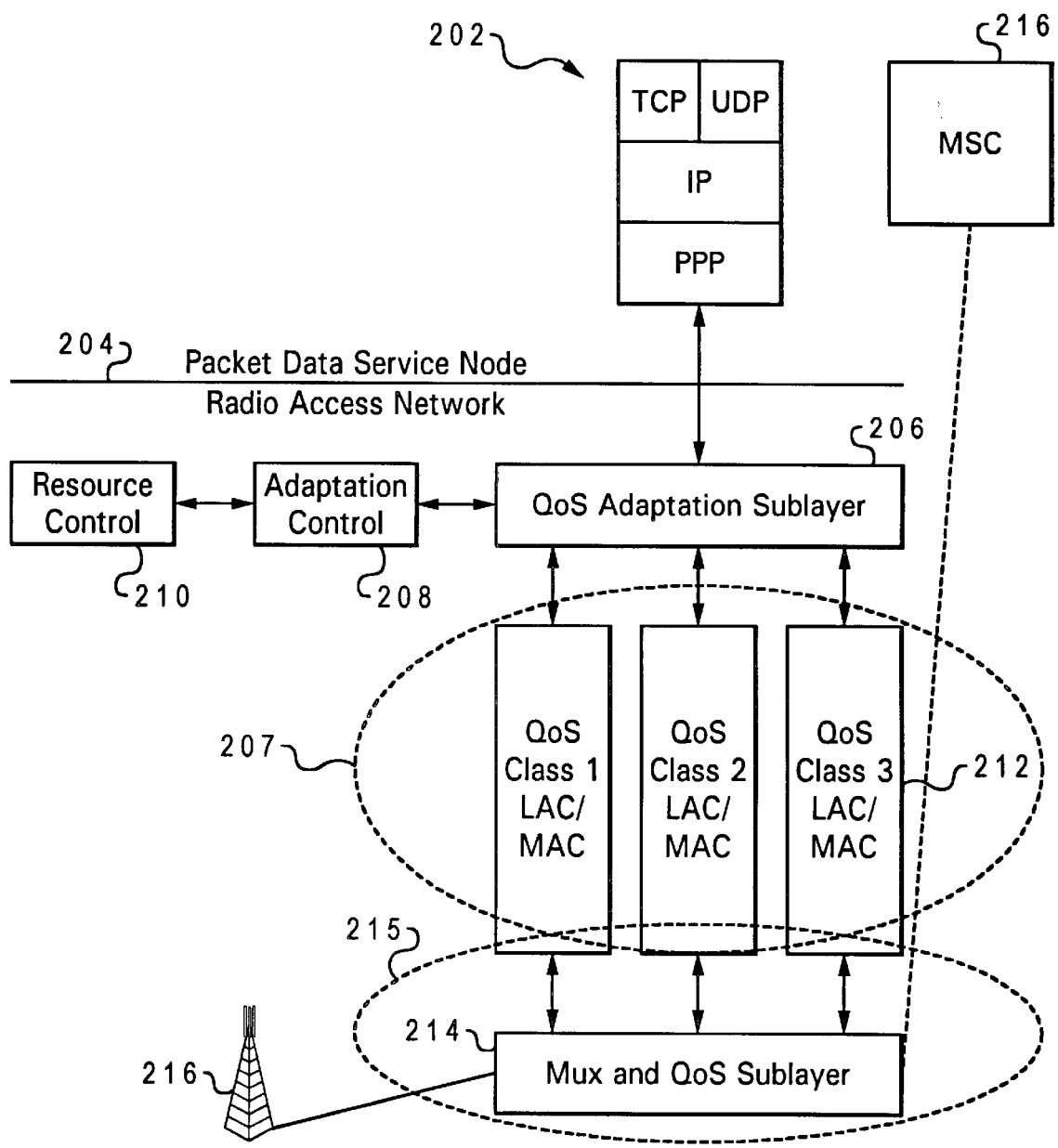
FIG. 2 illustrates a high-level block diagram of a wireless quality of service architecture in accordance with a preferred embodiment of the present invention.

Referring now to FIG. 2, a high-level block diagram of a wireless Quality of Service architecture according to a preferred embodiment of the present invention, is illustrated. Data packets are transmitted over a Packet Data Service node (router) from a connected IP network in the form of IP/PPP data packets 202. Multiple packet data flows having different QoS requirements may be supported under a single PPP connection—that is, different packet data flows requiring different QoS may be transmitted in a single session. Following the progress of IP/PPP packet 202 as it moves from the IP network to a receiving device, packet 202 is routed to BSC 207 via QoS Adaptation Sublayer (QAS) 206. QAS 206 directs packet 202 to one of the LAC/MAC classes, each having different QoS levels. QAS 206 includes a quality of service application interface for controlling wireless data transmission between a wireless network and radio link resources.

Adaptation control 208 utilizes resource control 210 to determine specific QoS classes for each identified signal's packet data flow. Resource control 210 contains a database of user profiles that include class of service for each customer that accesses the system. Adaptation control 208 determines the identity of the packet data flow and applies the proper QoS class to that flow. A packet data flow is therefore processed by LAC/MAC 207 with the proper QoS class and delivered to Mux and Qos Sublayer 214. Mux and QoS sublayer 214 in BTS 215 forwards the packet data flow to the assigned physical channel(s) available in physical layer 216 to be transmitted over the air.

An incoming data packet flow is treated similarly. The packet data flow is received via physical layer 216 and is then passed up to Mux and QoS sublayer 215. One of the LAC/MAC instances 212, having a proper QoS class, processes the packet data flow and delivers it to the upper layer via QoS adaptation Sublayer 206. LAC/MAC 212 instances associated with different QoS classes have different mechanisms controlling the radio resources to achieve corresponding QoS requirements. Different LAC/MAC ARQ and RLP require a different set of dedicated physical layer channels with specific QoS capabilities. The incoming packet data flow from QAS 206 is directed to a particular LAC/MAC within BSC 207 based on the identified required class. In this embodiment QAS 206 is shown as being included in BSC 207. Though BSC 207 is part of Radio Access Network (RAN), locating QAS in BSC 207 is not required for proper operation of the present invention.

QoS architecture includes QoS Adaptation Sublayer (QAS), QoS Adaptation Control (QAC) and multiple LAC/MAC instances of different classes for supporting various QoS requirements. A packet data flow transmission, utilizing the QoS architecture of the present invention, is received into and sent through an IP network in IP/PPP packet form. The packet data flow is routed to the appropriate BS and processed by QAS to determine the class of service to supply for the signal. As the class is determined, the packet data flow is then routed through the relevant LAC/MAC instance and the appropriate class mechanism is associated with the packet data flow. The packet data flow is given the predetermined QoS class as provided for in the Resource Control entity and transmitted through the BTS to the target device.

QAS, in a wireless system, buffers and classifies data traffic and directs the classified traffic to a LAC/MAC of the same class. QAC controls the behavior of the QAS and communicates with the Resource Control entity which manages all the resources in the wireless system and is connected to the database containing the user profile.

Figure 3:
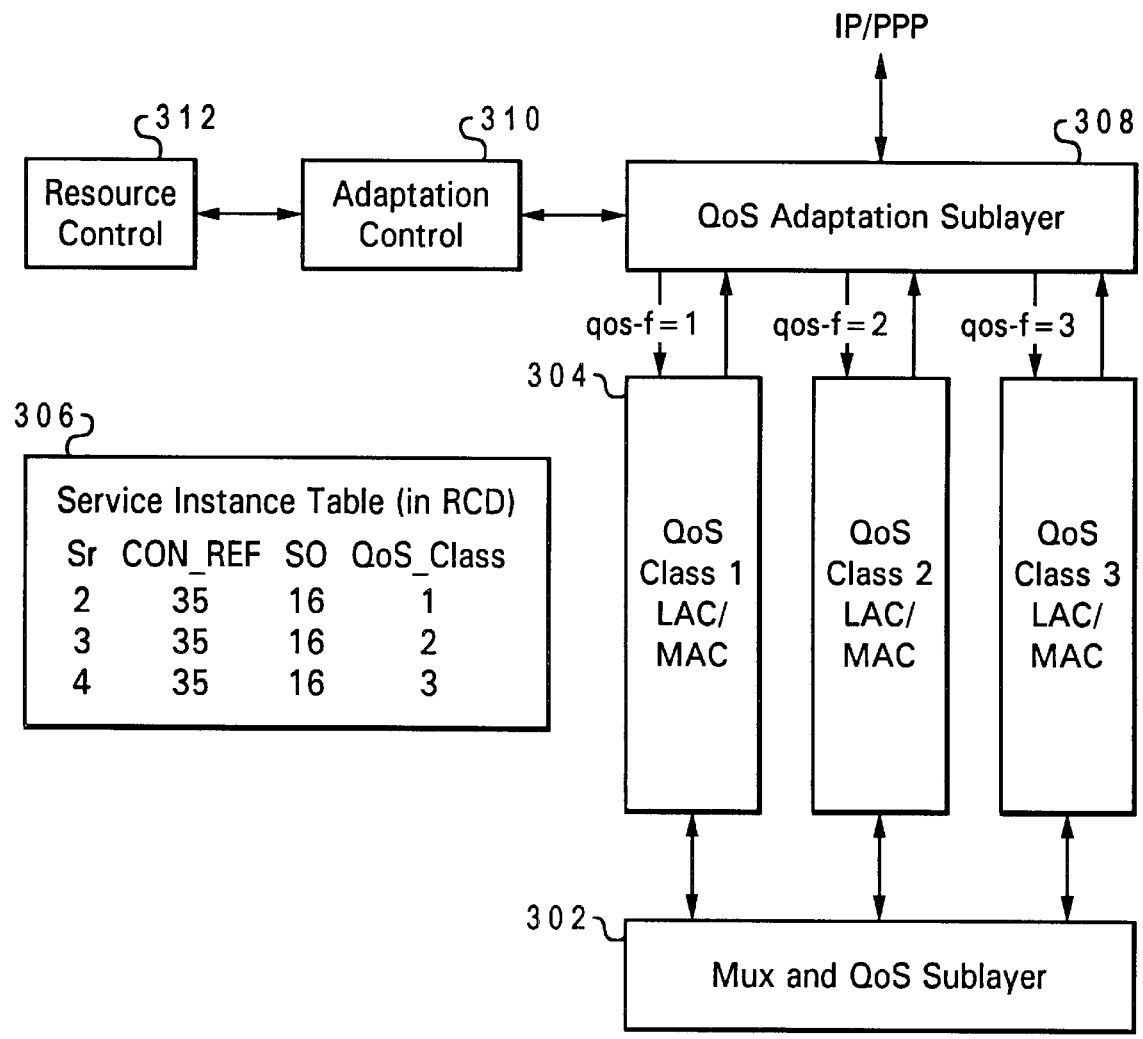
FIG. 3 depicts a high-level block diagram of QoS architecture depicting requirements on forward traffic in accordance with a preferred embodiment of the present invention.

Referring to FIG. 3, a high-level block diagram of QoS architecture depicting requirements on forward traffic in accordance with the present invention, is depicted. QoS requirements on forward and reverse traffic for a particular user may be different. qos-f denotes forward (downlink) traffic and qos-r denotes reverse (uplink) traffic.

In a BSC-MSC pair, each LAC/MAC instance of different class corresponds to a unique Service Reference (sr_id). sr_id is used by a LAC/MAC instance for delivering data traffic over the air to the correct peer LAC/MAC instance on the network. The value of sr id is determined by the following equation: sr_id=f(CON_REF, QoS_Class) computed at the BS. LAC/MAC 304 instance of any QoS class provides a specific QoS support to data traffic in both the forward (downlink) and reverse (uplink) directions. A LAC/MAC of different class may differ in RLP behaviors, data buffering mechanisms, data retransmission schemes, and state machines; therefore providing a different QoS treatment to a service. Different sets of radio resources may be controlled by different LAC/MAC instances as well.

As indicated above, multiple services may be accommodated during one IP/PPP session, each having different QoS needs. For instance, one or more high speed packet services may be connected-with one Service Option (SO). Up to N service references (sr_id) may co-exist for signal traffic flows having different QoS requirements. For a specific packet data SO, the maximum number of LAC/MAC instances (classes) is equal to the maximum number of service with different QoS_Class (see Service Instance Table 306).

Selection of a LAC/MAC class in a base station for a forward packet data traffic is based on the qos-f identifier that is part of the signal. The qos-f identifier is determined by the QoS Adaptation Sublayer and Adaptation Control after reading the packet flow information in the packet data IP header. The packet flow information includes the protocol ID, the IP address of the source and destination host and the port ID of the source and destination host. This information may be also obtained in the compressed PPP header. For reverse traffic, the qos-r identifier is determined at the mobile station QoS Adaptation Sublayer (not shown) and confirmation (or change) is made by Base station QoS Adaptation Sublayer 308. Adaptation Control 310 utilizes Resource Control's 312 connection to the profile database to properly associate the Class requirements with the IP/PPP data flow.

Forward traffic is directed to a LAC/MAC instance of the same QoS class as specified by the QAS entity. For reverse traffic in a mobile station, the selection of the class for a LAC/MAC instance not only depends on its QAS, but is also subject to the network infrastructure decision through signaling messages.

Figure 4:
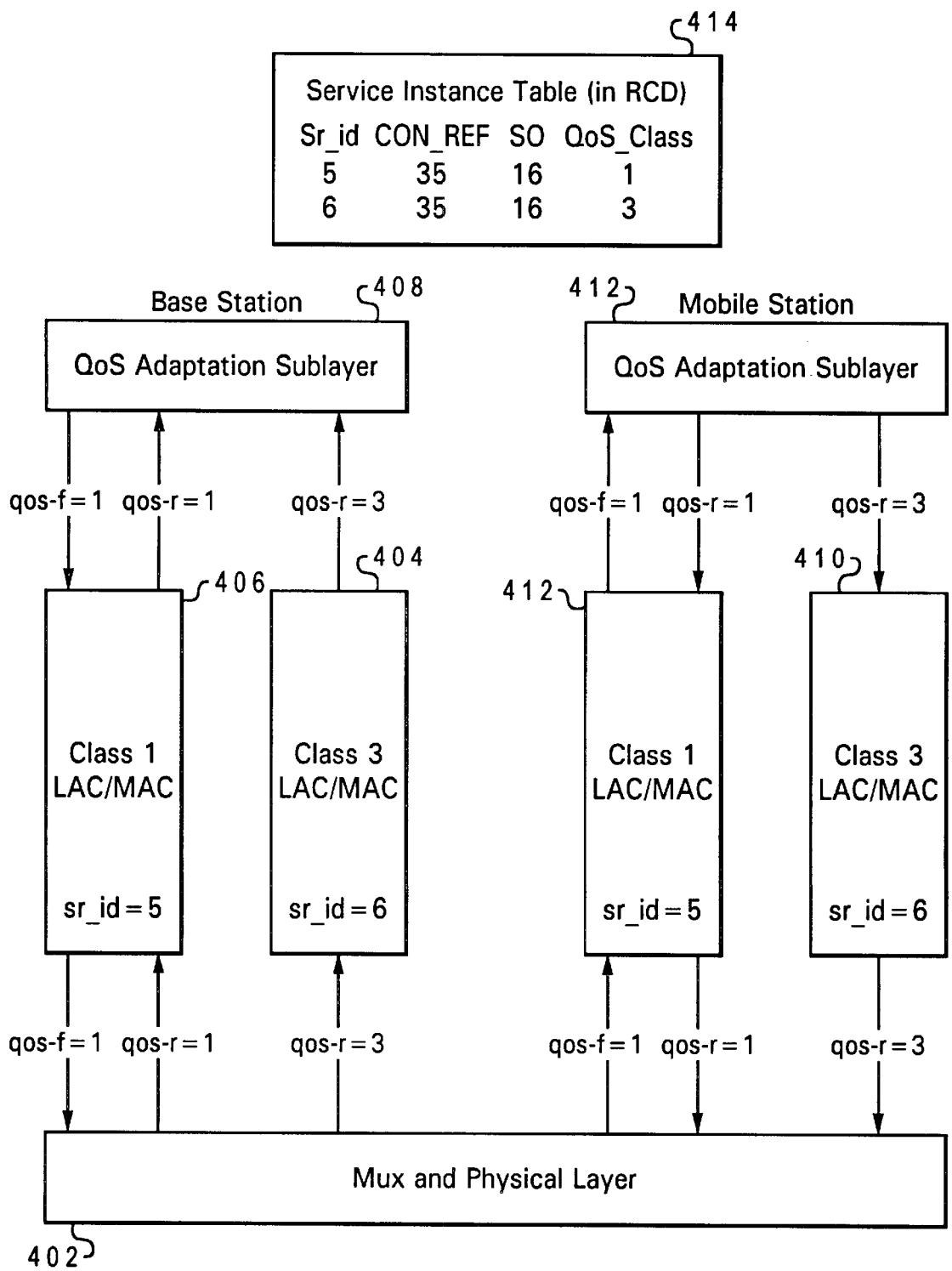
FIG. 4 illustrates a high-level block diagram of QoS architecture depicting requirements and operation in both forward and reverse traffic in accordance with the present invention.

Referring now to FIG. 4, a high-level block diagram of QoS architecture depicting requirements and operation in both forward and reverse traffic in accordance with the present invention, is illustrated. As pointed out above a LAC/MAC class provides a particular QoS support in both forward and reverse direction (qos-f and qos-r). For a given user, if there is more than one set of QoS requirements in any direction multiple LAC/MAC instances, each belonging to a different class, are required. In the example shown in FIG. 4, forward traffic has only one QoS requirement—qos-f=1, and reverse traffic has two requirements, qos-r=1 and qos-r=3.

A default, and temporary, class may be created in both a BSC and the associated MSC for packet data flows that do not have a pre-defined class. For instance, after a high speed packet data Service Option is connected, a default (i.e., best effort) class of class 3 is created in both BSC and MSC and serves as a temporary class for the SO connection. Base Station controls the setup of a class LAC/MAC instance and concurrently determines the sr_id where sr_id=f(CON_REF, QoS_Class).

A packet data flow is received into QAS 408 from a connected IP network and it is determined (Service Instance Table checks the value of sr_id, where sr_id=5) that qos-f of the signal is 1. The packet data flow is then associated with the parameters of Class 1 406, which may indicate (depending on the operator's classification parameters) broad bandwidth and high priority parameters. The packet data flow is then passed through the Class 1 LAC/MAC (generally, the packets would have originated in a Class 1 LAC/MAC peer on the network) through the Mux and Physical layer 402. Next, the packet data flow is sent to peer LAC/MAC 409 for a targeted Mobile Station which receives (downloads) the packet data utilizing the associated Class 1 parameters. Class parameters are usually determined by the customer and the operator before any use of the network by a user/customer.

It may be that a customer requires a particular class of service in one direction and another class of service in the other direction. For instance, a field representative may download data for a client, but never upload any data but email. The download class would likely require broad bandwidth, error correction and probably a high priority. Priority would be required if the customer wanted to be sure that when the field rep wants the data, there would be available space on the BSC and MSC to carry the broad bandwidth packet data. Email would not be such a high priority nor would it require a broad bandwidth and error correction may not be as necessary.

A mobile station packet data flow may be associated with Class 3 parameters and when the mobile station transmitted, the QAS would check the IP header on the data packets and associate the appropriate class with the transmissions, in this case Class 3. The packets would pass through Class 3 LAC/MAC 410 and on to MUX/Physical Layer 402. The packets would then enter peer Class 3 LAC/MAC 404 and on through Base Station QAS 408 with the qos-r=3 to be sent to a target receiving station on the IP network.

Figure 5:
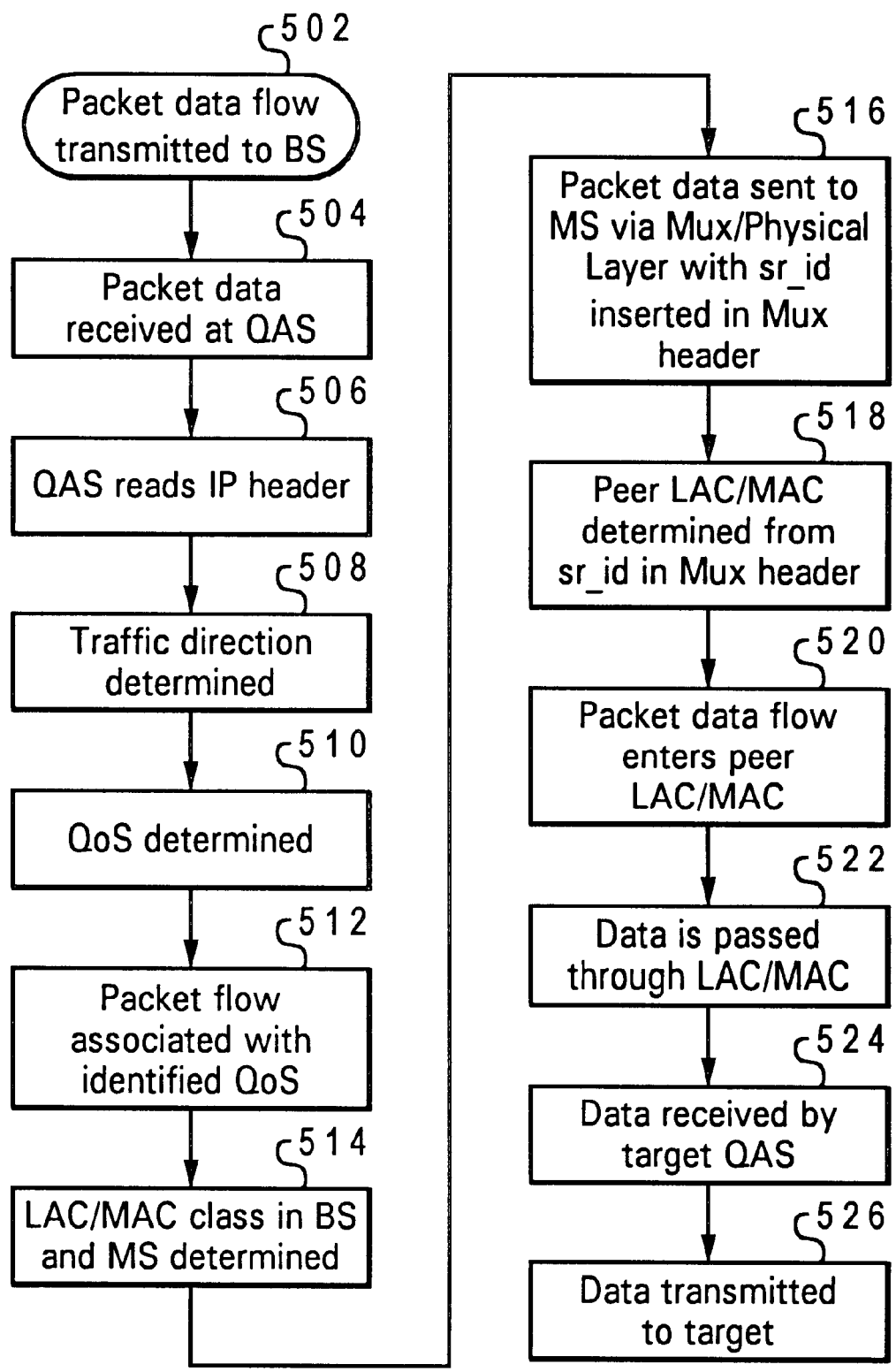
FIG. 5 depicts a high-level block diagram of a PPP packet in accordance with a preferred embodiment of the present invention.

Referring to FIG. 5, a high-level flow diagram of a process for utilizing QoS architecture to classify packets in a wireless network in accordance with the present invention is illustrated. The process begins with step 502, which depicts a wireless data packet being transmitted to a BS. The process proceeds to step 504, which illustrates the packet being received at the Quality of Service Adaptation Sublayer located in the Base Station (in this embodiment). The process passes to step 506, which depicts QAS reading packet data flow information from the IP header or the header of the compressed PPP header.

The process then passes to step 508, which illustrates the QAS determining the direction of the packet flow, whether it is forward or reverse. If the direction is forward, the QoS may be one group of restrictions and if reverse a completely different set of restrictions. The process then passes to step 510, which depicts the QAS having determined the QoS of the signal.

Next, the process proceeds to step 512, which illustrates the appropriate QoS being associated with the packet flow (qos-f or qos-r). The process continues to step 514, which depicts the LAC/MAC peer, for receiving the transmitted packet data. The process then proceeds to step 516, which illustrates the packet data being transmitted to the mobile station via Mux/Physical Layer with sr__id inserted in the Mux header. The process passes to step 518, which depicts the peer LAC/MAC being determined from the sr__id in the received Mux header. The process next proceeds to step 520, which illustrates the packet data flow entering the peer LAC/MAC instance.

The process continues to step 522 which depicts the packet data flow being received at the mobile station LAC/MAC layer. The process then passes to step 524, which illustrates the mobile station QAS forwarding the packet data to the application running on a target device of step 526, such as a laptop PC.

QoS parameters, used for providing metrics of QoS requirements or performance, can be expressed in two forms: qualitative or quantitative. For each parameter of each QoS class, the translation between these two forms can be defined in a mapping table provided in a Base Station. This mapping table can be updated by the BS dynamically. QoS for wireless transmissions is made available utilizing the packet flow information for packet application identification. A packet data flow transmitted to a Base Station receives a QoS value and is then transmitted to a peer mobile station that is connected with a target receiving device. The data is then transmitted to the receiving device.

While the invention has been particularly shown and described with reference to a preferred embodiment, it will be understood by those skilled in the art that various changes in form and detail may be made therein without departing from the spirit and scope of the invention.

What is claimed is:

1. A method for providing a pre-defined quality of service to a wireless transmission, said method comprising:
    receiving a wireless transmission at a base station connected to a wireless network;
    providing a quality of service application interface for controlling said wireless transmission between said wireless network and radio link resources;
    storing pre-defined quality of service parameters for data transmissions within a wireless telecommunications system;
    providing different levels of quality of service in either forward or reverse data traffic direction;
    utilizing said pre-defined quality of service parameters to classify data transmissions within said wireless telecommunication system by
        selecting a radio link class of a mobile unit transmitted signal based on a QoS-f class; and
        selecting a radio link class of a network transmitted signal based on a QoS-r class; and
    directing said data transmissions, having an identified requirement, to a target radio link control resource within said wireless telecommunication system.

2. The method of claim 1, further comprising:
    providing a quality of service application interface in all base station controllers connected to said wireless network.

3. The method of claim 1, further comprising:
    mapping quality of service parameters to a base station and mobile station pair wherein said mapping may be dynamically updated for each connected mobile unit.

4. The method of claim 1, wherein said providing different levels of quality of service in either forward or reverse data traffic direction, further comprising:
    identifying a user;
    determining quality of service parameters for said user;
    determining whether a received signal is a forward or reverse signal; and
    applying said parameters to said received signal.

5. The method of claim 1, wherein said providing a quality of service application interface for controlling said wireless transmission between said wireless network and radio link resources, further comprising:
    responsive to receiving a packet transmission, utilizing a database containing subscriber parameters; and
    directing said packet transmission to a specific radio link controller class.

6. The method of claim 1, further comprising:
    transmitting a service instance table to a wireless device; and
    dynamically updating said service instance table by transmitting a new service instance table to said wireless device.

7. An apparatus for providing a pre-defined quality of service to a wireless data transmission, said apparatus comprising:
    a wireless telecommunications network;
    a base station connected to said wireless network for receiving said wireless data transmission;
    a quality of service application interface for controlling said wireless data transmission between said wireless network and radio link resources;
    pre-defined quality of service-parameters for associating with said wireless data transmissions in said wireless telecommunications network, wherein said pre-defined quality of service further includes
        means for selecting a radio link class of a mobile unit transmitted signal based on a QoS-f class; and
        means for selecting a radio link class of a network transmitted signal based on a QoS-r class;
    logic means for providing different levels of quality of service in either forward or reverse data traffic direction;
    logic means for classifying data transmissions in said wireless network utilizing said pre-defined quality of service parameters; and
    transmission means for directing said data transmissions, with an identified classification, to a different quality of service control based on a desired quality of service for said wireless data transmission.

8. The apparatus of claim 7, further comprising:
    comparison means for determining a quality of service designation from said wireless data transmission; and
    interface means for providing said quality of service application interface in all base station controllers connected to said wireless network.

9. The apparatus of claim 7, further comprising:
mapping means for mapping quality of service parameters to a base station and mobile station pair wherein said mapping may be dynamically updated for each connected mobile unit.

10. The apparatus of claim 7, wherein logic means for providing different quality of service levels in either forward or reverse data traffic direction further comprising:
comparison means for identifying a user;
logic means for determining quality of service parameters for said user;
logic means for determining whether a received signal is a forward or reverse signal; and
attachment means for applying said parameters to said received signal.

11. The apparatus of claim 7, wherein said quality of service application interface for controlling transmission between a wireless network and radio link resources further comprising:
responsive to receiving a packet transmission, means for utilizing a database containing subscriber parameters;
means for directing said packet transmission to a specific radio link controller class.

12. A computer program product residing on a computer usable medium associated with a wireless telecommunication network for providing a pre-defined quality of service to a wireless data transmission, said computer program product comprising:
program code means for receiving said wireless data transmission at a base station connected to said wireless telecommunication network;
program code means for providing different levels of quality of service in either forward or reverse data traffic direction;
program code means for providing a quality of service application interface for controlling said wireless data transmission between said wireless network and radio link resources;
program code means for storing pre-defined quality of service parameters for associating said parameters with said wireless data transmissions;
program code means for utilizing said pre-defined quality of service parameters to classify data transmissions in said wireless telecommunications network, wherein said program code means for utilizing said pre-defined quality of service parameters further includes
program code means for selecting a radio link class of a mobile unit transmitted signal based on a quality of service-forward class; and
program code means for selecting a radio link class of a network transmitted signal based on a quality of service-reverse class; and
program code means for directing said wireless data transmissions, with an identified classification, to a different quality of service control based on a desired quality of service for said wireless data transmission.

13. The computer program product of claim 12, further comprising:
program code means for determining a quality of service designation from said wireless data transmission; and
program code means for providing said quality of service application interface in all base station controllers connected to said wireless network.

14. The computer program product of claim 12, further comprising:
program code means for mapping quality of service parameters to a base station and mobile station pair, wherein said mapping may be dynamically updated for each connected mobile unit.

15. The computer program product of claim 12, wherein said program code means for providing different quality of service levels in either forward or reverse data traffic direction further comprising:
program code means for identifying a user;
program code means for determining quality of service parameters for said user;
program code means for determining whether a received signal is a forward or reverse signal; and
program code means for applying said parameters to said received signal.

16. The computer program product of claim 12, wherein said program code means for providing a quality of service application interface for controlling transmission between a wireless network and radio link resources further comprising:
program code means for responsive to receiving a packet transmission, utilizing a database containing subscriber parameters;
program code means for directing said packet transmission to a specific radio link controller class.

17. The computer program product of claim 12, further comprising:
program code means for transmitting a service instance table to a wireless device; and
program code means for dynamically updating said service instance table by transmitting a new service instance table to said wireless device.

* * * * *